(12) United States Patent
Ninesling et al.

(10) Patent No.: US 11,830,528 B2
(45) Date of Patent: Nov. 28, 2023

(54) UNIVERSAL TAPE CARTRIDGE CHARACTERIZATION

(71) Applicants: Matthew John Ninesling, Arvada, CO (US); Jon Benson, Boulder, CO (US); Ian Cubbon, Tucson, AZ (US)

(72) Inventors: Matthew John Ninesling, Arvada, CO (US); Jon Benson, Boulder, CO (US); Ian Cubbon, Tucson, AZ (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 17/989,258

(22) Filed: Nov. 17, 2022

(65) Prior Publication Data

US 2023/0169994 A1    Jun. 1, 2023

Related U.S. Application Data

(60) Provisional application No. 63/283,399, filed on Nov. 26, 2021.

(51) Int. Cl.
| | | |
|---|---|---|
| *G11B 15/07* | (2006.01) | |
| *G11B 20/02* | (2006.01) | |
| *G11B 5/455* | (2006.01) | |
| *G11B 5/008* | (2006.01) | |
| *G11B 33/04* | (2006.01) | |

(52) U.S. Cl.
CPC .......... *G11B 5/455* (2013.01); *G11B 5/00813* (2013.01); *G11B 33/04* (2013.01)

(58) Field of Classification Search
CPC ..... G11B 27/36; G11B 15/07; G11B 15/0835; G11B 20/02; G11B 20/025; G11B 5/00813; G11B 2220/41; G11B 2220/90; G06F 3/0619; G06F 3/0634; G06F 3/0686; G06F 11/3428; G06F 11/3452; G06F 17/00
USPC ............................................ 360/78.03, 78.02
See application file for complete search history.

(56) References Cited

U.S. PATENT DOCUMENTS

| | | | |
|---|---|---|---|
| 5,819,309 A | * | 10/1998 | Gray ...................... G11B 15/07 360/134 |
| 10,426,057 B2 | | 9/2019 | Jesionowski et al. |
| 10,832,714 B2 | | 11/2020 | Biskeborn |
| 10,902,874 B2 | | 1/2021 | Kasada |

* cited by examiner

*Primary Examiner* — Nabil Z Hindi
(74) *Attorney, Agent, or Firm* — Kenneth Altshuler (57) ABSTRACT

Characterizing virgin tape cartridges in a characterization tape library and then sending the characterized tape cartridges to an end-user's library saves time and effort at the end-user's site. A characterized tape cartridge can be universally used in any compatible tape library if the virgin tape cartridge is characterized in a target calibration window that is within a specific range of heat and humidity. A calibration library can act as a 'middleman' receiving a virgin tape cartridge directly from an OEM. The virgin tape cartridge can be characterized followed by storing a record of the calibration in the tape cartridge's MAM while in the calibration library. The now post-characterized tape cartridge is then on to a user's tape library for use instead of just simply sending a virgin tape cartridge to the end user's library. The record in the MAM effectively changes the designation of the virgin tape cartridge to a post-calibrated tape cartridge.

20 Claims, 4 Drawing Sheets

UNIVERSAL TAPE CARTRIDGE CHARACTERIZATION

CROSS-REFERENCE TO RELATED APPLICATIONS

This application claims priority to and the benefit of U.S. Provisional Patent Application Ser. No. 63/283,399 entitled Universal Tape Cartridge Characterization filed on Nov. 26, 2021.

FIELD OF THE INVENTION

The present embodiments are directed to providing universally characterized tape cartridges in a controlled environment.

DESCRIPTION OF RELATED ART

Like most digital storage media, the aerial density of tape media is increasing significantly year-over-year. In the quest to achieve higher aerial density, track density, and bit density on the tape media must both increase. This translates into smaller track widths and compressing more bits in the length of each track. The trade-off is greater potential for errors in both servo tracking and data storage and recall. Adding complexity to this problem, tape media substrates, made out of polyethylene naphthalate, can stretch a little and change dimensions with heat and humidity thereby distorting data bits and tracks just a little. To combat this problem, each new (virgin) tape cartridge undergoes a characterization/calibration scheme carried out in the environmental conditions inside of a tape library via a tape drive. Characterization can take between thirty minutes to two hours and includes stretching the tape medium by winding the tape medium forwards and backwards a number of times. Time spent characterizing a tape cartridge is a time-consuming process that diverts a tape library from storing user data.

It is to innovations related to characterizing tape cartridges that the claimed invention is generally directed.

SUMMARY OF THE INVENTION

The present embodiments generally relate to characterizing tape cartridges in a specific environment that can be universally used in tape libraries.

In that light, certain embodiments contemplate a method for producing a universal calibrated tape cartridge is described in view of all of the figures, the method comprising: disposing a plurality of virgin tape cartridges and a plurality of calibration tape drives in a first (characterization) environment that is within a target calibration window. The target calibration window comprises a controlled temperature and humidity that is less than but within a recommended window of operation. The window of operation is within an allowable window of operation. As mentioned, the target calibration window is a tighter window (has a smaller range) than the allowable window of operation. Next, a first tape cartridge is made to form a cooperating relationship with one of the plurality of calibration tape drives. While in the cooperating relationship, the first tape cartridge is fully characterized, or otherwise calibrated, meaning the characterization process is initiated until the first tape cartridge is fully calibrated. This is systematically done for all the virgin tape cartridges. A calibrated tape cartridge, also identified as a post-characterized (universal) tape cartridge, is transported away from the first environment to some off-site customer library that is likely many miles away from the first environment and loaded into the off-site customer library. The off-site customer library is in a second environment that is independent from the first environment. As previously mentioned, the post-characterized tape cartridge is devoid of any user data on its tape medium. In other words, the tape medium inside of the tape cartridge does not yet have user data thereon because it is considered a new but already characterized tape cartridge ready to store customer data. Hence, when the post-characterized tape cartridge is loaded in a tape drive in the off-site customer library, it is ready to store customer data.

Still, another embodiment of the present invention envisions a tape cartridge calibration method comprising loading a first virgin tape cartridge from a plurality of virgin tape cartridges into a calibration tape drive. The plurality of virgin tape cartridges and calibration tape drive are in a calibration tape library. The first virgin tape cartridge comprises a first MAM. The plurality of virgin tape cartridges and the calibration tape drive are in a first environment possessing a controlled temperature and relative humidity that does not deviate outside of a target calibration window. The method continues with calibrating the first virgin tape cartridge via the calibration tape drive by at least winding and rewinding the first virgin tape cartridge while in the target calibration window. The target calibration window is entirely within but narrower than a predefined recommended window of operation. The predefined recommended window is within but narrower than an allowable window of operation. Once the calibrating step is completed, storing a calibration record to the first MAM and designating the first virgin tape cartridge as a first post-calibrated tape cartridge. Next, the post-calibrated tape cartridge is relocated to a mass storage tape library, tape medium in the first calibrated tape cartridge is devoid of any user data (i.e., data sent from a client/user/data consumer of the library for storage to the library). Next, storing new user data for a data consumer on the tape medium in the first calibrated tape cartridge while the first calibrated tape cartridge is inside of the mass storage tape library. The inside of the mass storage tape library possesses a second environment that is different from the first environment, the first calibrated tape cartridge is devoid of the user data prior to the relocating step because the first calibrated tape cartridge is essentially a new tape cartridge ready to store user data that has simply been characterized/calibrated.

Yet another method embodiment can comprise operating a calibration library within a target heat and humidity window (target environment). During the operating step the calibration library calibrates a virgin tape cartridge via a calibration tape drive contained in a calibration tape library. The calibration tape library comprising a first environment does not deviate from the target environment. After the calibrating step, storing a calibration record to a MAM within the virgin tape cartridge. After the storing step, changing the designation of the virgin tape cartridge to a post-calibrated tape cartridge. A data-consumer library that is operating in a data-consumer environment that deviates from the target environment. The operating step includes storing user data from a client of the data consuming tape library to tape recording medium in the post-calibrated tape cartridge only after obtaining the calibration record from the MAM. The client can be located next to the data consuming library or be some user of data that is externally linked to the data consuming library via the Internet, for example. Externally linked means linked to the data consuming library by way of a wireline or wirelessly wherein the user of data is not within the data consuming library. The data-consumer environment is at least 100 feet away from the target environment. The calibration library does not include storing user data from the at least one external source to the tape recording medium.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving universal characterization of tape cartridges. The phrases "in one embodiment", "according to one embodiment", and the like generally mean the particular feature, structure, or characteristic following the phrase is included in at least one embodiment of the present invention, and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable margins of the normal world and is analogous with "more or less." For example, essentially flat, essentially straight, essentially on time, etc. all indicate that these characteristics are not capable of being perfect within the sense of their limits. Accordingly, if there is no specific +/− value assigned to "essentially", then assume essentially means to be within +/−3% of exact. In what follows, similar or identical structures may be identified using identical callouts.

Embodiments disclosed herein are generally directed to methods for characterizing tape cartridges in a target calibration window that is within a specific range of heat and humidity that can be universally used in tape libraries. From a high-level perspective, virgin tape cartridges, received directly from an original equipment manufacturer (OEM), are calibrated for universal use for all tape libraries that support the tape cartridge generation, such as an LTO-9 tape cartridge. The calibration occurs in a calibration tape library that acts as an "in-between" or "middle-man" that receives virgin tape cartridges from an OEM and later provides post-calibrated tape cartridges to an end-user library elsewhere. The universal calibration is performed in a tightly controlled target calibration window and a record is stored to the tape cartridge's medium auxiliary memory (MAM) following the calibration routine. The post-calibrated (universal) tape cartridge is then sent (or shipped) to an end user's library where it can be used immediately and without being calibrated in the end user's library. More concisely, aspects of the present invention envision a calibration library acting as a 'middleman' receiving a virgin LTO-9 tape cartridge, calibrating or otherwise characterizing the LTO-9 tape cartridge, storing a record of the calibration in the LTO-9 tape cartridge MAM in the calibration library, then sending it on to a user's tape library for use as opposed to simply sending a virgin LTO-9 tape cartridge to an end user's library. The record in the MAM effectively changes the designation of the virgin LTO-9 tape cartridge to a post-calibrated LTO-9 tape cartridge.

One problem with high density virgin tape cartridges, such as an LTO-9 tape cartridge, is that the tape medium in the tape cartridge must be calibrated/characterized in a libraries environment before it is ready to store user data. More specifically, the tape medium inside of an LTO-9 tape cartridge is wound and rewound over a tape read-head while in a recommended heat and humidity window of operation before data can start being recorded thereto. Hence, standard operation is to ship a virgin LTO-9 tape cartridge from an OEM to an end user's library wherein the virgin LTO-9 tape cartridge is calibrated/characterized (in the end user's tape library environment). Obviously, a virgin tape cartridge has no user data recorded to its tape medium. Once calibrated in the end-user's library, a record affirming calibration is stored to the virgin LTO-9 tape cartridge's MAM. The below figures and associated description are provided to illustrate embodiments of the present invention.

Figure 1:
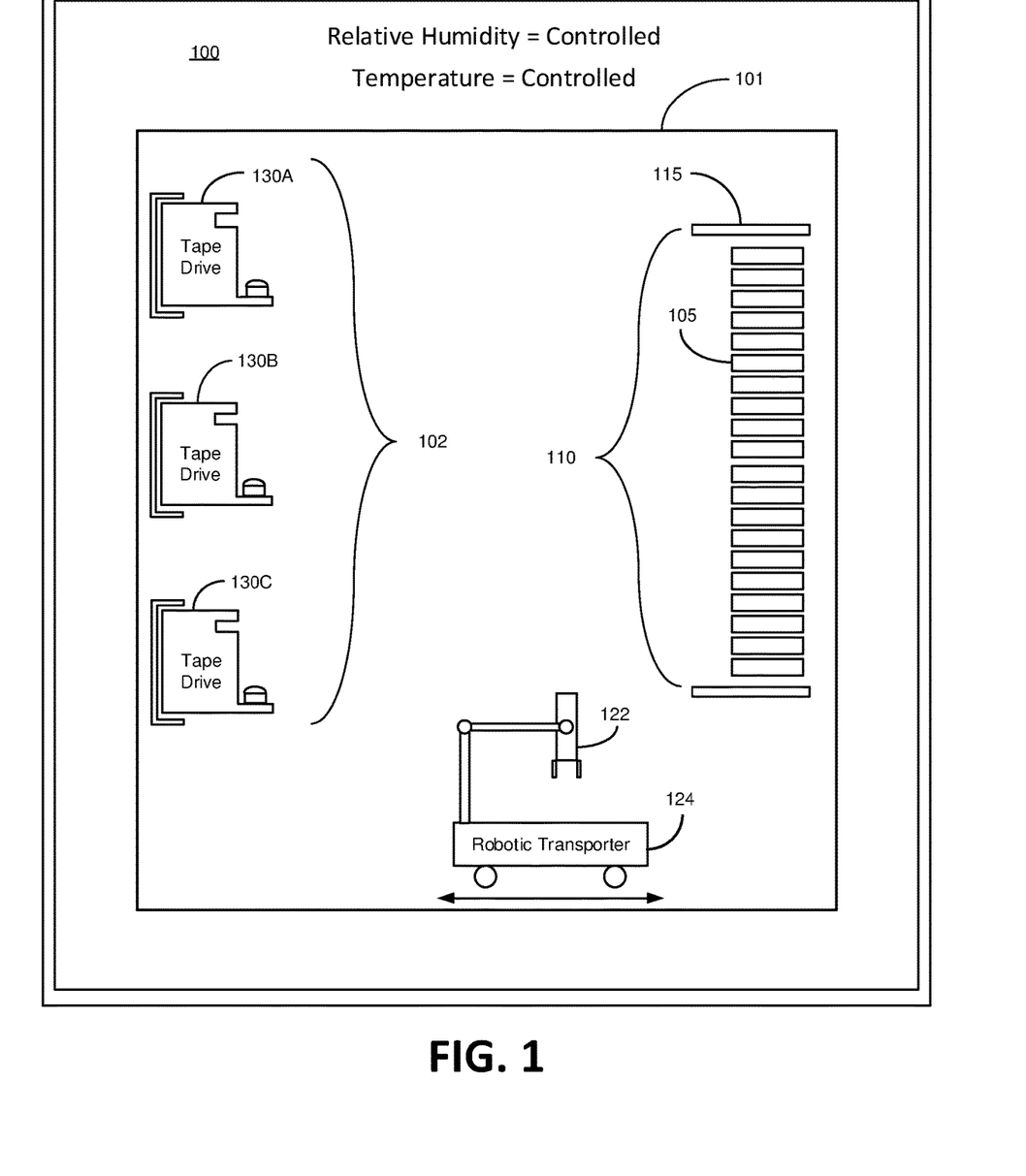
FIG. 1 is a block diagram of a controlled temperature and humidity environment for calibrating virgin tape cartridges consistent with embodiments of the present invention.

FIG. 1 is a block diagram of a controlled temperature and humidity environment for calibrating, or characterizing, virgin tape cartridges consistent with embodiments of the present invention. Fundamentally, an environmentally controlled room 100 comprises a plurality of virgin tape cartridges 100, a robotic transporter 124 that can transport a virgin tape cartridge 105 to one of a bank/plurality of tape drives 102. In this embodiment, the environmentally controlled room 100 comprises one or more tape libraries 101 that each comprise a plurality of virgin tape cartridges 105, at least one robotic transporter 124, and a plurality of tape drives 102 that more or less comprise the elements in the room 100. The robotic transporter 124 transports or otherwise moves a tape cartridge around the library 101, such as between tape drives 130 and the shelf system 111. The one or more tape libraries 101 reach the same or nearly the same controlled relative humidity and control temperature as the environmentally controlled room 100. A virgin tape cartridge 105 is defined as a tape cartridge provided directly from an OEM (original equipment manufactured), such as an LTO tape cartridge produced by Sony headquartered in Tokyo, Japan, or Fuji headquartered in Tokyo, Japan, and has not been used in a tape library.

LTO (Linear Tape-Open) is an open standard magnetic tape data storage technology originally developed in the late 1990s. Three companies control the LTO Consortium (Hewlett-Packard enterprise, IBM, and Quantum Corporation), these companies direct all development and manage licensing and certification of LTO media and LTO mechanism manufacturers. HP's headquarters is in Palo Alto, CA, IBM's headquarters is in Armonk, NY, Quantum's headquarters is in San Jose, CA Presently Fuji and Sony are the only manufacturers of LTO tapes and IBM is the only manufacturer of LTO tape drives. For example, an LTO-9 generation tape cartridge can hold 18 TB of data. Given the large storage capacity, the tension of the media, which is influenced by heat and humidity, plays an important role in characterizing or otherwise calibrating the LTO-9 media. Accordingly, every virgin LTO-9 tape cartridge must go through a characterization process once loaded into a tape library to take into account the tape library's internal environment. The characterization process involves, among other things, tensioning each virgin tape cartridge by winding and rewinding (multiple times) the tape media in the environmental conditions of the tape library. Calibrating a virgin LTO-9 tape cartridge typically takes between 30 minutes and two hours to complete. In a sense, each virgin LTO-9 tape cartridge is calibrated to the environmental conditions (i.e., heat and humidity) of the tape library that contains the virgin tape cartridge.

Figure 2:
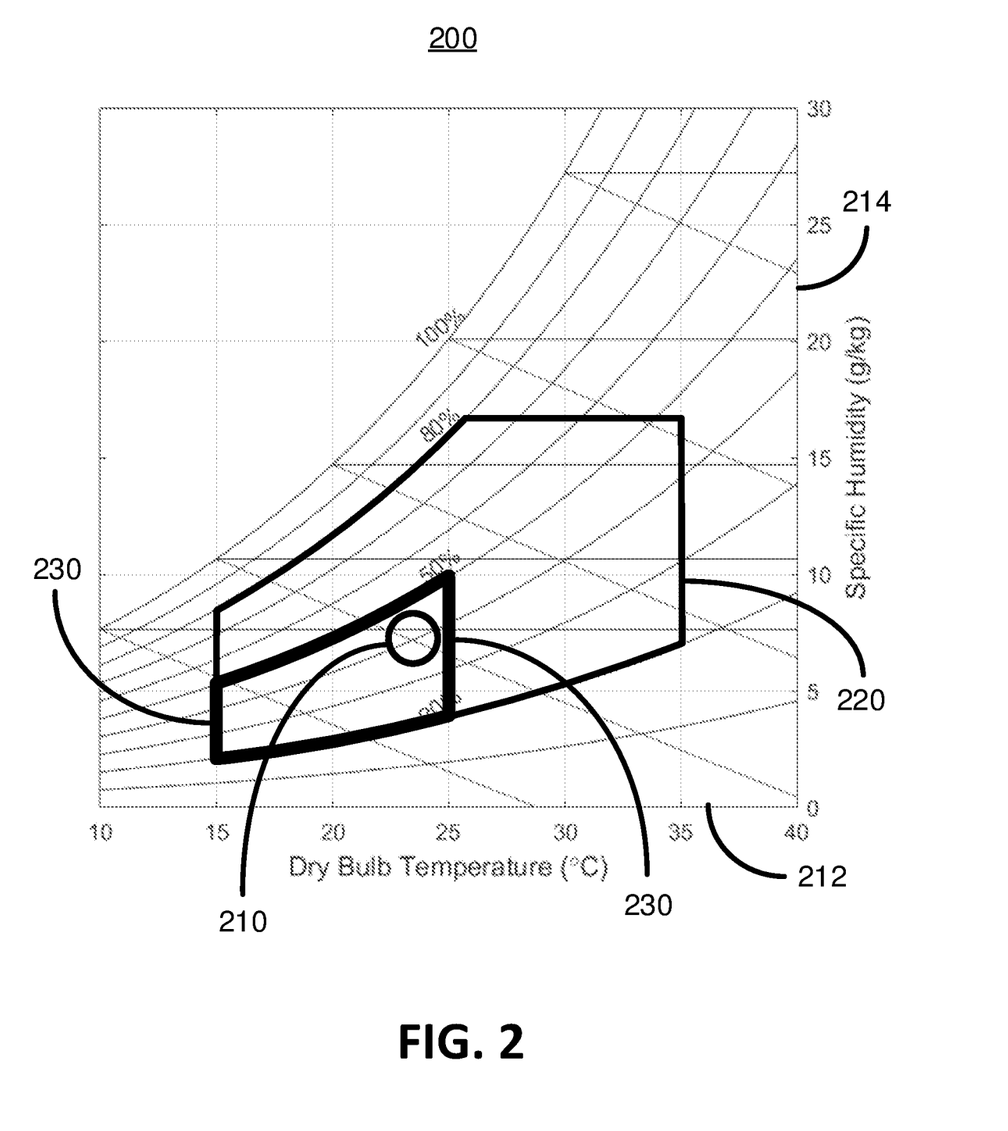
FIG. 2 is a graphical depiction of an LTO-9 psychrometric chart showing the recommended operating environments for reading and writing to an LTO-9 tape cartridge consistent with embodiments of the present invention.

FIG. 2 is a graphical depiction of an LTO-9 psychrometric chart showing the recommended operating environments for reading and writing to an LTO-9 tape cartridge consistent with embodiments of the present invention. The LTO-9 psychrometric chart 200 is defined by a dry bulb temperature 212 in degrees centigrade (x-axis) with respect to the specific humidity 310 in g/kg (y-axis). The psychrometric chart 200 depicts an allowable window of operation 220 and a recommended window of operation 230. The allowable window of operation 220 is between 15° C. and 35° C. with a relative humidity between 20% Rh and 80% Rh. The allowable window of operation 220, or allowable operating environment, represents a heat and humidity envelope where the LTO-9 tape drive and tape cartridge combination are verified as functional for short-term operation, such as hours for example. The recommended window of operation 230, or recommended operating environment, represents a heat and humidity envelope where the LTO-9 tape drive and tape cartridge combination are recommended to function long-term, such as for years. Certain embodiments of the present invention contemplate a target calibration window 210, which in the present embodiment is a circular window between 22° C. and 25° C. with a relative humidity between 30% Rh and 50% Rh. Other embodiments envision the target calibration window not being circular but rather following the temperature gradients between 20° C. and 25° C. and the humidity gradients between 20% Rh and 50% Rh. In these embodiments, the target calibration window 210 is in the upper right portion of the recommended window of operation 230 because once calibrated, the LTO-9 tape cartridge is characterized in a way to better suit going into the allowable window of operation 220 when used with a tape library in the future.

Figure 3:
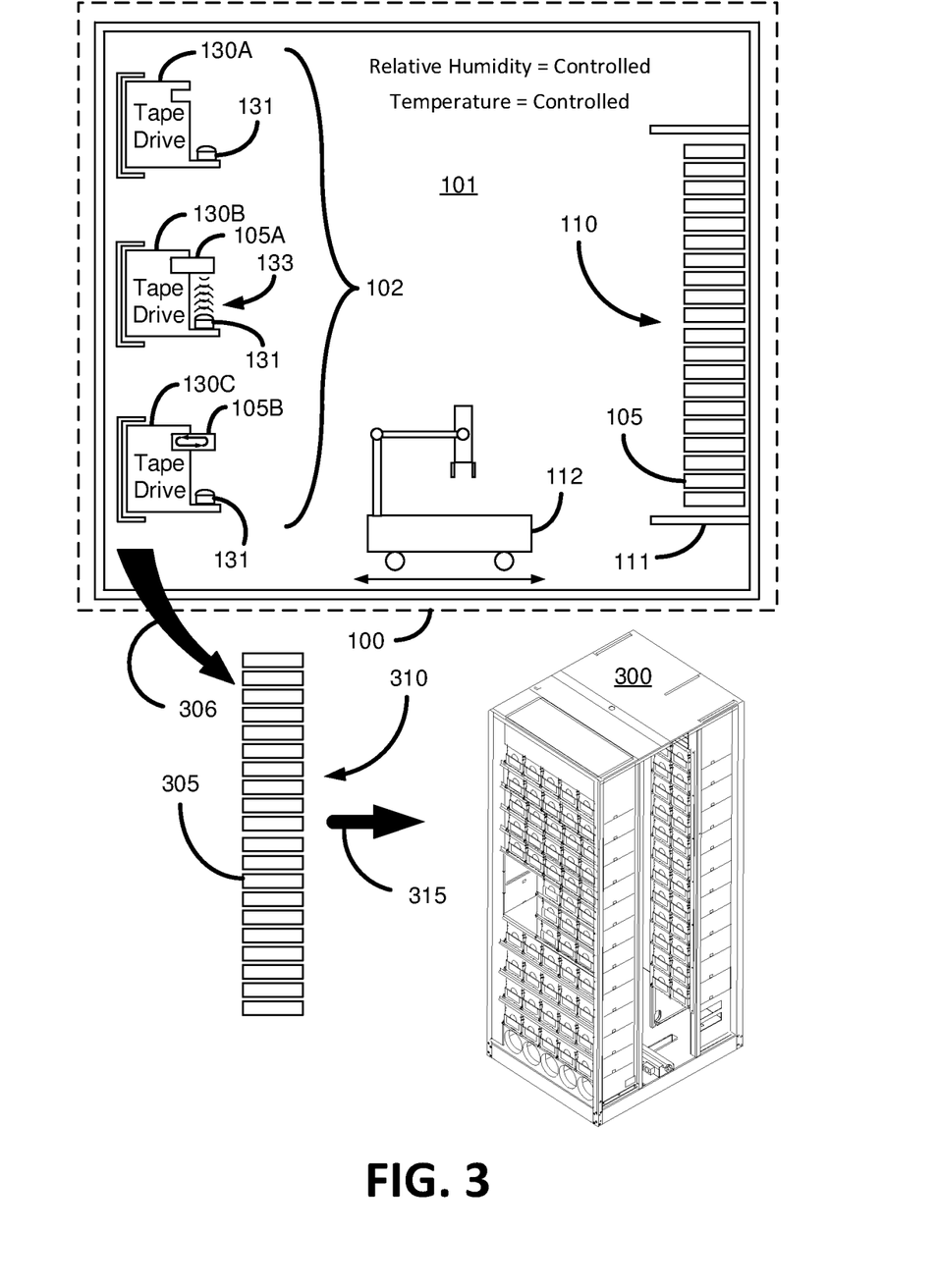
FIG. 3 diagrammatically depicts a process of certifying virgin tape cartridges to be newly used in a tape library elsewhere consistent with embodiments of the present invention.

FIG. 3 diagrammatically depicts a process of certifying virgin tape cartridges to be newly used in a tape library elsewhere consistent with embodiments of the present invention. FIG. 3 is described in view of the block diagram flowchart of FIG. 4. From a high level, a plurality of virgin tape cartridges 110 are brought to a characterization/calibration environment 100 that is maintained in the target calibration window 210, which could be a heat and humidity and controlled room or a heat and humidity controlled encased library, just to name several examples. In the present embodiment, temperature and humidity in the calibration library 101 does not deviate outside of the target calibration window 210. The target calibration window 210 is in the sweet spot for temperature and humidity for all tape storage operation that function in the allowable window of operation 220. A characterization environment 100 is different from a final destination tape library 300 and that any library 101 in the characterization environment is not intended to perform storage operations. A storage operation is defined as storing mass quantities of user data to the tape medium (not shown), via a cooperating tape drive 130, that resides in a target tape cartridge 105. User data is defined as data transmitted or otherwise sent to a final destination tape library 300 that is then stored for long-term safekeeping on the target tape cartridge 110. While in the characterization environment 100, each virgin tape cartridge 105 is loaded in a tape drive 130 and calibrated. A record of the completed calibration is stored to each corresponding tape cartridge MAM before the post-calibrated tape cartridge 305 is removed, shown by the arrow 306, from the calibration tape library 101. Each of the calibrated tape cartridges 305 are physically sent, arrow 315, to a final destination library 300 that is in a location separate from the characterization environment 100. Because a tape cartridge need only be characterized one time, a post-characterized tape cartridge 305 that is sent to a client, or final destination, is immediately ready to perform storage operations when initially loaded in an LTO-9 tape drive at a new library 300 in the final destination. Obviously, this saves time and hassle for the client at the final destination 300. It is presumed that the end-user library 300 using the post-characterized tape cartridge 305 is at least operating in the allowable heat and humidity window of operation 220 and more likely in the recommended heat and humidity window of operation 230, which are both broader ranges than the target heat and humidity calibration window 210.

Figure 4:
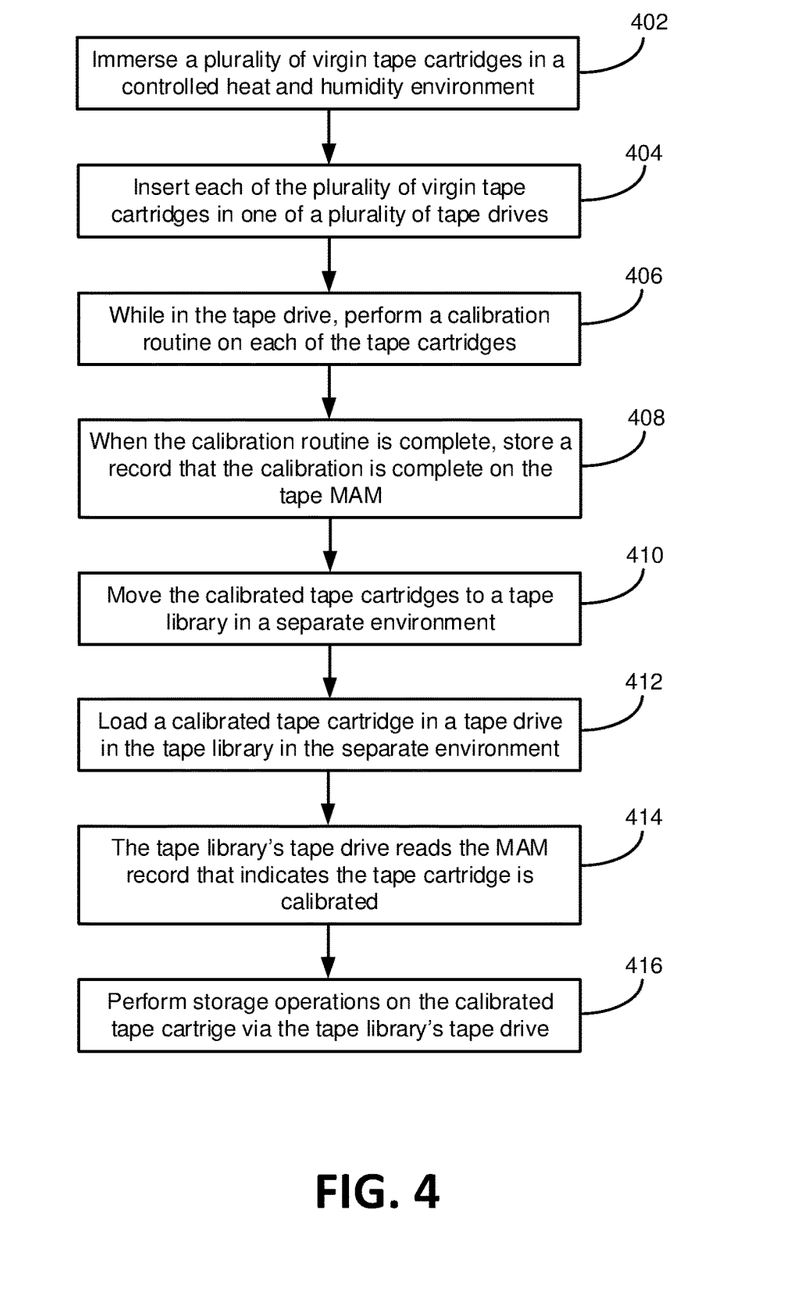
FIG. 4 is a block diagram flow chart of a method to characterize virgin tape cartridge for initial use in a tape library consistent with embodiments of the present invention.

With respect to the steps of FIG. 4, a plurality of virgin tape cartridges 110 are put inside of a controlled relative humidity and temperature environment 100 that is maintained in the target calibration window 210, step 402. In the present embodiment, the controlled relative humidity and temperature environment 100 is in, and not outside of, the target calibration window 210 (depicted in the psychrometric chart 200 of FIG. 2). Certain embodiments envision holding/immersing the virgin tape cartridges 105 in the controlled environment 100 for a period of time, such as at least 30 minutes, to acclimate to the temperature and humidity in the controlled environment 100. Other certain embodiments envision the tape drives 130 at steady-state with the temperature and humidity in the controlled environment 100 because they are disposed in the controlled environment more or less all the time.

As shown in step 404, with the virgin tape cartridges 105 immersed in the controlled environment 120, each of the virgin tape cartridges 105 are systematically inserted in a tape drive 130 where calibration of the virgin tape cartridge 105 takes place. In the present embodiment, the virgin tape cartridges 105 are disposed in a tape library 101 that is inside of the controlled environment 120. Each of the virgin tape cartridges 105 are moved from a shelf system 111 to the tape drives 130 via a robotic transporter 112. The robotic transporter 112 loads each virgin tape cartridge 105 into a tape drive 130, as shown.

In the present depiction, tape drive 130A is an open tape drive ready to receive a virgin tape cartridge 105, tape drive 130B is engaged with a tape cartridge 105A, and tape drive 130C is engaged with a tape cartridge 105B. When a tape drive 130 is engaged with the tape cartridge 105, it is meant that the tape cartridge 105 is loaded in the tape drive 130 to form a cooperating characterization/calibration relationship consistent with the characterization routines described herein. In this figure, tape drive 130C is in the process of being characterized by the characterization routine on tape cartridge 105B, as shown by the rotating arrows in the tape cartridge 105B. Accordingly, the calibration scheme is performed on the plurality of virgin tape cartridges 110 via a corresponding tape drive 130, step 406.

When the characterization/calibration routine is complete, a record indicating that the characterization routine is complete is stored on the tape MAM (medium auxiliary memory), step 408. A tape MAM (not shown) resides in the interior of the tape cartridge 105 and is fundamentally comprised of an integrated circuit that includes solid-state memory, a transponder both attached to an antenna (not shown). A MAM is a power-harvesting device that is activated when in the presence of a strong enough RF field produced by a MAM reader and writer 131 to induce sufficient operating current in the antenna. The MAM reader and writer 131 is integrated with the tape drive 130. MAM technology leverages off passive RFID technology. In the present embodiment, when the tape cartridge 105 has completed the characterization routine, the MAM reader and writer 131 wirelessly transmits a signal 133 to the tape cartridge MAM recording that the post-characterization tape cartridge 305 has completed the characterization routine. The MAM recording 133 is illustratively depicted with tape drive 130B and tape cartridge 105A by way of the 'curved-wave lines' 133. Once characterization is complete, the post-characterized tape cartridge 305 is removed from the tape drive 130 and a new virgin tape cartridge 105 is loaded into the tape drive 130 and the process is repeated.

As depicted in FIG. 3, a plurality of post-characterization tape cartridges 310 are removed 306 from the controlled environment 100 and transported to a target tape library 300 located at a final destination. The final destination can be halfway around the world, but is generally many miles from the controlled environment 100. The target tape library 300 is a separate environment that is assumed operating in the allowable window of operation 220. Regardless, at least one post-characterized tape cartridge 305 is moved into the target tape library 300 that is a separate environment from the controlled environment 100, step 410. The post-characterized tape cartridge 305 is loaded in a tape drive 130 in the target tape library 300, step 412. Once in the target tape library tape drive 130, the post-characterized tape cartridge MAM is read target library tape drive 130 verifying that the tape cartridge 305 has been calibrated/characterized, step 414. Instead of dealing with characterizing the newly introduced tape cartridge 305, the target tape library 300 can simply engage in storage operations on the post-characterized tape cartridge 305, step 416.

Certain embodiments envisions a ventilated housing (not shown) surrounding the tape drive motor, read/write head and other elements in a tape drive. The ventilated housing can have a built in fan or use an external fan to force the air inside of the calibration library 101, the air being strictly in the target calibration window 210. This more quickly brings the virgin tape cartridge 105 that is in the tape drive to reach the temperature and humidity level in target calibration window 210. This is especially important for any virgin tape cartridges 105 that have been recently disposed in the calibration tape library 101 but have not yet reached or acclimated to the temperature and humidity level in target calibration window 210.

With the present description in mind, below are some examples of certain embodiments illustratively complementing some of the methods and apparatus embodiments discussed above and presented in the figures to aid the reader. The elements called out below are provided by example to assist in the understanding of the present invention and should not be considered limiting. The reader will appreciate that the below elements and configurations can be interchangeable within the scope and spirit of the present invention.

In that light, certain embodiments contemplate a method for producing a universal calibrated tape cartridge 305 is described in view of all of the figures, the method comprising: disposing a plurality of virgin tape cartridges 110 and a plurality of calibration tape drives 102 in a first (characterization) environment 100 that is within a target calibration window 210. This is shown in step 402 of FIG. 4. The target calibration window 210 comprises a controlled temperature 212 and humidity 214 that is less than but within a recommended window of operation 230. By less than but within, it is meant that the target calibration window 210 is some percentage tighter (smaller) than the recommended window of operation 230, such as less than 50% of the recommended window of operation 230. The window of operation 230 is within an allowable window of operation 220. As mentioned, the target calibration window 210 is a tighter window (has a smaller range) than the allowable window of operation 230. Next, as shown in step 404, a first tape cartridge 105 is made to form a cooperating relationship with one of the plurality of calibration tape drives 130. A cooperating relationship is when a tape cartridge 105 is loaded in a tape drive 130 and can thereafter be wound and rewound in the tape cartridge spindles (not shown) and can further communicate 133 with a MAM reader/write 131. While in the cooperating relationship, the first tape cartridge 105 is fully characterized, or otherwise calibrated, meaning the characterization process is initiated until the first tape cartridge 105 is fully calibrated. This is systematically done for all the virgin tape cartridges 110, as described in step 406. A calibrated tape cartridge 305, also identified as a post-characterized (universal) tape cartridge 305, is transported 306 away from the first environment 100 to some off-site customer library 300 that is likely many miles away from the first environment 100 and loaded into the off-site customer library 300, steps 410-412. The off-site customer library 300 is in a second environment that is independent from the first environment 100. As previously mentioned, the post-characterized tape cartridge 305 is devoid of any user data on its tape medium. In other words, the tape medium inside of the tape cartridge 305 does not yet have user data thereon because it is considered a new but already characterized tape cartridge 305 ready to store customer data. Hence, when the post-characterized tape cartridge 305 is loaded in a tape drive in the off-site customer library 300, it is ready to store customer data. The term universal, as in universal calibrated tape media 305, is intended to mean that the tape media 305 is usable in without first being calibrated and in some cases without any future calibration so long as the universal calibrated tape media 305 is used in the allowable window of operation 220.

The method for producing the universal calibrated tape cartridge 305 is further imagined wherein the first calibrated tape cartridge 305 has a record of calibration retained in its MAM. This can further comprise reading the record in the off-site tape library 300 and acknowledging that the first calibrated tape cartridge 305 has completed the calibrating step and does not need to be calibrated in the off-site tape library 300.

The method for producing the universal calibrated tape cartridge 305 further envisioning the plurality of tape cartridges 110 are calibrated in the first environment 100.

The method for producing the universal calibrated tape cartridge 305 further imagining the calibrating step 406 and 408 being accomplished in a tape library 101.

The method for producing the universal calibrated tape cartridge 305 further envisioning the second environment being a second room that is independent from the first environment 100, which is in a first room.

The method for producing the universal calibrated tape cartridge 305 further contemplating the second environment having a different temperature from the controlled temperature and a different relative humidity than the controlled relative humidity, that is a different temperature and humidity than the target calibration window 210.

The method for producing the universal calibrated tape cartridge 305 further being wherein the target calibration window 210 comprises a temperature that is between 20 C and 25 C and controlled humidity that is between 30% RH and 50% RH, the first environment 100 does not extend outside of the target calibration window 210. This can further be wherein the first calibrated tape cartridge 305 does not need to be calibrated a second time when loaded in the off-site tape library 300 that is in the second environment.

The method for producing the universal calibrated tape cartridge 305 is further imagined wherein the plurality of calibration tape drives 130 is in a calibration tape library 101 that does not store the user data on tape media in any of the plurality of virgin tape cartridges 110.

The method for producing the universal calibrated tape cartridge 305 further envisioned whereby the calibrating step includes winding and rewinding the tape medium at least one time.

The method for producing the universal calibrated tape cartridge 305 further envisioning the second environment being outside of the target calibration window 210.

The method for producing the universal calibrated tape cartridge 305 comprising an embodiment wherein the plurality of virgin tape cartridges 110 are LTO-9 tape cartridges.

Another embodiment of the present invention contemplates a tape cartridge calibration method comprising loading a first virgin tape cartridge 105 from a plurality of virgin tape cartridges 110 into a calibration tape drive 130. The plurality of virgin tape cartridges 110 and calibration tape drive 130 are in a calibration tape library 101. The first virgin tape cartridge 105 comprises a first MAM. The plurality of virgin tape cartridges 110 and the calibration tape drive 130 are in a first environment 100 possessing a controlled temperature and relative humidity that does not deviate outside of a target calibration window 210. The method continues with calibrating the first virgin tape cartridge 105 via the calibration tape drive 130 by at least winding and rewinding the first virgin tape cartridge 105 while in the target calibration window 210, the target calibration window 210 is entirely within but narrower than a predefined recommended window of operation 230, the predefined recommended window 230 is within but narrower than an allowable window of operation 220. Once the calibrating step is completed, storing a calibration record to the first MAM and designating the first virgin tape cartridge 105 as a first post-calibrated tape cartridge 305. Next, the post-calibrated tape cartridge is relocated to a mass storage tape library 300, tape medium in the first calibrated tape cartridge 305 is devoid of any user data (i.e., data sent from a client/user/data consumer of the library 300 for storage to the library 300). Next, storing new user data for a data consumer on the tape medium in the first calibrated tape cartridge 305 while the first calibrated tape cartridge 305 is inside of the mass storage tape library 300. The inside of the mass storage tape library 300 possesses a second environment that is different from the first environment 100, the first calibrated tape cartridge 305 is devoid of the user data prior to the relocating step because the first calibrated tape cartridge 305 is essentially a new tape cartridge ready to store user data that has simply been characterized/calibrated.

The tape cartridge calibration method embodiment further envisioning the calibration tape drive 130 being at least partially surrounded by a housing, increasing flow of air from the first environment through the housing during the calibrating step.

The tape cartridge calibration method embodiment further defining the target calibration window 210 comprising a temperature that is between 20 C and 25 C and controlled humidity that is between 30% RH and 50% RH, the first environment 100 does not extend, or otherwise comprise a temperature and RH outside of the target calibration window 210. Certain embodiments envision mass storage operations to the first calibrated tape cartridge 305 when in the mass storage tape library 300 while the second environment is outside of the target calibration window 210.

The tape cartridge calibration method embodiment can further define the first calibrated tape cartridge 305 not being calibrated a second time when loaded in the mass storage tape library 300.

The tape cartridge calibration method embodiment further envisioning the first environment 100 being in a first room the second environment being in a second room, wherein the first room is at least 100 feet away from the second room.

Yet another method embodiment can comprise operating a calibration library 101 within a target heat and humidity window (target environment) 210/100. During the operating step the calibration library 101 calibrates a virgin tape cartridge 105 via a calibration tape drive 130 contained in a calibration tape library 101. The calibration tape library 101 comprising a first environment 100 does not deviate from the target environment 210/100. After the calibrating step, storing a calibration record to a MAM within the virgin tape cartridge 105. After the storing step, changing the designation of the virgin tape cartridge 105 to a post-calibrated tape cartridge. A data-consumer library 300 that is operating in a data-consumer environment that deviates from the target environment 210/100. The operating step includes storing user data from a client of the data consuming tape library 300 to tape recording medium in the post-calibrated tape cartridge 305 only after obtaining the calibration record from the MAM. The client can be located next to the data consuming library 300 or be some user of data that is externally linked to the data consuming library 300 via the Internet, for example. Externally linked means linked to the data consuming library 300 by way of a wireline or wirelessly wherein the user of data is not within the data consuming library 300. The data-consumer environment is at least 100 feet away from the target environment 210/100. The calibration library 101 does not include storing user data from the at least one external source to the tape recording medium.

The above embodiments are not intended to be limiting to the scope of the invention whatsoever because many more embodiments are easily conceived within the teachings and scope of the instant specification. Moreover, the corresponding elements in the above example should not be considered limiting.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though a ventilated tape drive can be used in the calibration library 101, this is not necessary in certain embodiments. Also, though a heat and humidity environment is described surrounding a calibration library 101, the interior environment need only be at the temperature and humidity level maintained within target calibration window 210. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method for producing a universal calibrated tape cartridge, the method comprising:
   disposing a plurality of virgin tape cartridges and a plurality of calibration tape drives in a first environment that is within a target calibration window, the target calibration window comprises a controlled temperature and humidity that is within a recommended window of operation, the window of operation is within an allowable window of operation, the target calibration window is a tighter window than the allowable window of operation;
   forming a cooperating relationship with a first tape cartridge of the plurality of virgin tape cartridges and one of the plurality of calibration tape drives;
   while in the cooperating relationship with one of the plurality of calibration tape drives, calibrating the first tape cartridge until the first tape cartridge is fully calibrated;
   providing the first calibrated tape cartridge to a tape library, tape medium in the first calibrated tape cartridge is devoid of any user data;
   storing data for a data consumer on the first calibrated tape cartridge in the tape library, the tape library is in a second environment that is independent from the first environment.

2. The method of claim 1 wherein the first calibrated tape cartridge has a record of calibration retained in a medium auxiliary memory (MAM) that is contained by the first calibrated tape cartridge.

3. The method of claim 2 further comprising reading the record in the tape library and acknowledging that the first calibrated tape cartridge has completed the calibrating step and does not need to be calibrated in the tape library.

4. The method of claim 1 wherein the plurality of tape cartridges are calibrated in the first environment.

5. The method of claim 1 wherein the calibrating step is accomplished in a tape library.

6. The method of claim 1 wherein the second environment is a second room that is independent from the first environment, which is in a first room.

7. The method of claim 1 wherein the second environment comprising a different temperature from the target calibration window.

8. The method of claim 1 wherein the target calibration window comprising a temperature that is between 20 C and 25 C and controlled humidity that is between 30% RH and 50% RH, the first environment does not extend outside of the target calibration window.

9. The method of claim 8 wherein the first calibrated tape cartridge does not need to be calibrated a second time when loaded in the tape library in the second environment.

10. The method of claim 1 wherein the plurality of calibration tape drives is in a calibration tape library that does not store the user data on tape media in any of the plurality of virgin tape cartridges.

11. The method of claim 1 wherein the calibrating step includes winding and rewinding the tape medium at least one time.

12. The method of claim 1 wherein the second environment is outside of the target calibration window.

13. The method of claim 1 wherein the plurality of virgin tape cartridges are LTO-9 tape cartridges.

14. A tape cartridge calibration method comprising:
   loading a first virgin tape cartridge from a plurality of virgin tape cartridges into a calibration tape drive, the plurality of virgin tape cartridges and calibration tape drive are in a calibration tape library,
   the first virgin tape cartridge comprising a first MAM;
   the plurality of virgin tape cartridges and the calibration tape drive are in a first environment possessing a controlled temperature and relative humidity that does not deviate outside of a target calibration window;
   calibrating the first virgin tape cartridge via the calibration tape drive by at least winding and rewinding the first virgin tape cartridge while in the target calibration window, the target calibration window is entirely within but narrower than a predefined recommended window of operation, the predefined recommended window is within but narrower than an allowable window of operation;
   once the calibrating step is completed, storing a calibration record to the first MAM and designating the first virgin tape cartridge as a first post-calibrated tape cartridge;
   relocating the post-calibrated tape cartridge to a mass storage tape library, tape medium in the first calibrated tape cartridge is devoid of any user data; and
   storing user data for a data consumer on the tape medium in the first calibrated tape cartridge while in the mass storage tape library, inside of the mass storage tape library comprising a second environment that is different from the first environment, the first calibrated tape cartridge is devoid of the user data prior to the relocating step.

15. The tape cartridge calibration method of claim 14 wherein the calibration tape drive is at least partially surrounded by a housing, increasing flow of air from the first environment through the housing during the calibrating step.

16. The tape cartridge calibration method of claim 14 wherein the target calibration window comprising a temperature that is between 20 C and 25 C and controlled humidity that is between 30% RH and 50% RH, the first environment does not extend outside of the target calibration window.

17. The tape cartridge calibration method of claim 16 further comprising mass storage operations to the first calibrated tape cartridge when in the mass storage tape library while the second environment is outside of the target calibration window.

18. The tape cartridge calibration method of claim 14 wherein the first calibrated tape cartridge is not calibrated a second time when loaded in the mass storage tape library.

19. The tape cartridge calibration method of claim 14 wherein the first environment is a first room the second environment in a second room, the first room is at least 100 feet away from the second room.

20. A method comprising:
operating a calibration library within a target heat and humidity window (target environment)
during the operating the calibration library, calibrating a virgin tape cartridge via a calibration tape drive contained in a calibration tape library, the calibration tape library comprising a first environment that does not deviate from the target environment;
after the calibrating step, storing a calibration record to a MAM within the virgin tape cartridge;
after the storing, designating the virgin tape cartridge as a post-calibrated tape cartridge;
operating a data-consumer library in a data-consumer environment that deviates from the target environment, the operating includes storing user data from at least one external source to tape recording medium in the post-calibrated tape cartridge only after obtaining the calibration record from the MAM,
the at least one external source is at least one user of data externally connected to the data-consumer library,
the data-consumer environment is at least 100 feet away from the target environment,
the calibration library does not include storing user data from the at least one external source to the tape recording medium.

* * * * *